(12) United States Patent
Kim et al.

(10) Patent No.: US 10,180,740 B2
(45) Date of Patent: Jan. 15, 2019

(54) FINGERPRINT SENSOR AND TOUCH DEVICE INCLUDING THE SAME

(71) Applicant: LG INNOTEK CO., LTD., Seoul (KR)

(72) Inventors: Seung Jin Kim, Seoul (KR); Dong Mug Sung, Seoul (KR); Kyoung Jong Yoo, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 14/808,112

(22) Filed: Jul. 24, 2015

(65) Prior Publication Data

US 2016/0026844 A1    Jan. 28, 2016

(30) Foreign Application Priority Data

Jul. 25, 2014  (KR) .................. 10-2014-0095034
Aug. 5, 2014   (KR) .................. 10-2014-0100242

(51) Int. Cl.
*G06F 3/041*     (2006.01)
*G06K 9/00*      (2006.01)

(52) U.S. Cl.
CPC ........... *G06F 3/041* (2013.01); *G06K 9/0002* (2013.01)

(58) Field of Classification Search
CPC ............................................. G06F 2203/04111
See application file for complete search history.

(56) References Cited

U.S. PATENT DOCUMENTS

2013/0265137 A1    10/2013  Nelson et al.
2013/0279769 A1*   10/2013  Benkley, III ....... G06K 9/00013
                                                382/124

FOREIGN PATENT DOCUMENTS

KR    10-2014-0029081 A    3/2014

* cited by examiner

*Primary Examiner* — Robin Mishler
(74) *Attorney, Agent, or Firm* — Ked & Associates, LLP

(57) ABSTRACT

A fingerprint sensor includes a first substrate, a second substrate on the first substrate, a first electrode and a first chip on the first substrate and a second electrode and a second chip on the second substrate. The first substrate includes a first area and a second area, the second substrate includes a third area and a fourth area, the first electrode is provided on the first area, the first chip is provided on the second area, the second electrode is provided on the third area, and the second chip is provided on the fourth area.

6 Claims, 12 Drawing Sheets

FINGERPRINT SENSOR AND TOUCH DEVICE INCLUDING THE SAME

CROSS-REFERENCE TO RELATED APPLICATIONS

This application claims priority under 35 U.S.C. § 119 to Korean Application Nos. 10-2014-0095034, filed Jul. 25, 2014, and 10-2014-0100242, filed Aug. 5, 2014, whose entire disclosures are incorporated herein by reference.

BACKGROUND

1. Field

The embodiment relates to a fingerprint sensor and a touch device including the same.

2. Background

Recently, a touch device, which performs an input function through the touch of an image displayed on a display by an input device such as a finger or a stylus pen, has been applied to various electronic appliances.

A sensor to recognize a fingerprint may be applied to the touch device. In detail, various operations, such as on-off operations, of the touch device can be performed by touching the finger to the fingerprint sensor.

The fingerprint sensor may be manufactured by arranging electrodes and a fingerprint recognition driving chip on a substrate.

In the case of the fingerprint sensor, in order to detect the variation on a micro-cap, the distance between a sensing part and a chip must be short. However, as the sensing part becomes gradually away from the chip, the touch sensitivity of the fingerprint sensor may be degraded due to the noise resulting from the distance difference.

Accordingly, there is required a fingerprint sensor having a novel structure capable of solving the above problem and a touch device including the same.

BRIEF DESCRIPTION OF THE DRAWINGS

The embodiments will be described in detail with reference to the following drawings in which like reference numerals refer to like elements wherein.

DETAILED DESCRIPTION

Figure 1:
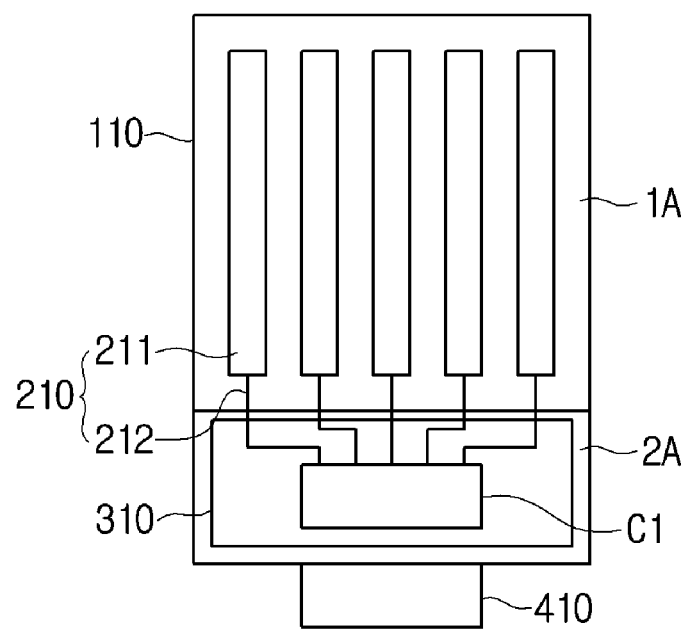
FIGS. 1 and 2 are exploded plan views showing a fingerprint sensor according to the first embodiment.

In the description of the embodiments, it will be understood that, when a layer (or film), a region, a pattern, or a structure is referred to as being "on" or "under" another substrate, another layer (or film), another region, another pad, or another pattern, it can be "directly" or "indirectly" over the other substrate, layer (or film), region, pad, or pattern, or one or more intervening layers may also be present. Such a position of the layer has been described with reference to the drawings.

It will be understood that when an element is referred to as being "connected" with another element, it can be directly connected with the other element or intervening elements may be present. In the following description, when a predetermined part "includes" a predetermined component, the predetermined part does not exclude other components, but may further include other components if there is a specific opposite description.

The thickness and size of each layer (film), region, pattern, or structure shown in the drawings may be exaggerated, omitted or schematically drawn for the purpose of convenience or clarity. In addition, the size of the layer (film), region, pattern, or structure does not utterly reflect an actual size.

Hereinafter, the embodiment will be described with reference to accompanying drawings in detail.

Hereinafter, a fingerprint sensor according to the embodiment will be described with reference to FIGS. 1 to 10.

Referring to FIGS. 1 to 10, the fingerprint sensor according to the embodiment may include a first substrate 110, a second substrate 120, a first chip C1 and a second chip C2.

The first and second substrates 110 and 120 may support the respective first and second chips C1 and C2.

The first and second substrates 110 and 120 may be rigid or flexible.

For example, the first and second substrates 110 and 120 may include glass or plastic. The substrate 100 may include chemically tempered/semi-tempered glass, such as soda lime glass or aluminosilicate glass, reinforced/flexible plastic, such as polyimide (PI), polyethylene terephthalate (PET), propylene glycol (PPG), or poly carbonate (PC), or sapphire.

In addition, the first and second substrates 110 and 120 may include an optically isotropic film. For example, the substrate 100 may include cyclic olefin copolymer (COC), cyclic olefin polymer (COP), optically isotropic polycarbonate (PC), or optically isotropic polymethyl methacrylate (PMMA).

The sapphire has superior electric characteristics, such as permittivity, so that a touch response speed may be greatly increased and a space touch such as hovering may be easily implemented. In addition, since the sapphire has high surface hardness, the sapphire is applicable to a cover substrate. The hovering refers to a technique of recognizing coordinates even at a slight distance from a display.

In addition, the first substrate 110 and the second substrate 120 may be partially bent to have a curved surface. That is, the substrate 100 may have a partial flat surface and a partial curved surface. In detail, an end of the substrate 100 may be bent to have a curved surface or may be bent or flexed to have a surface including a random curvature.

Further, the first substrate 110 and the second substrate 120 may include a flexible substrate having a flexible property.

Further, the substrate 100 may include a curved or bended substrate. That is to say, even the fingerprint sensor including the first and second substrates 110 and 120 may be formed to have a flexible, curved or bended property.

Figure 2:
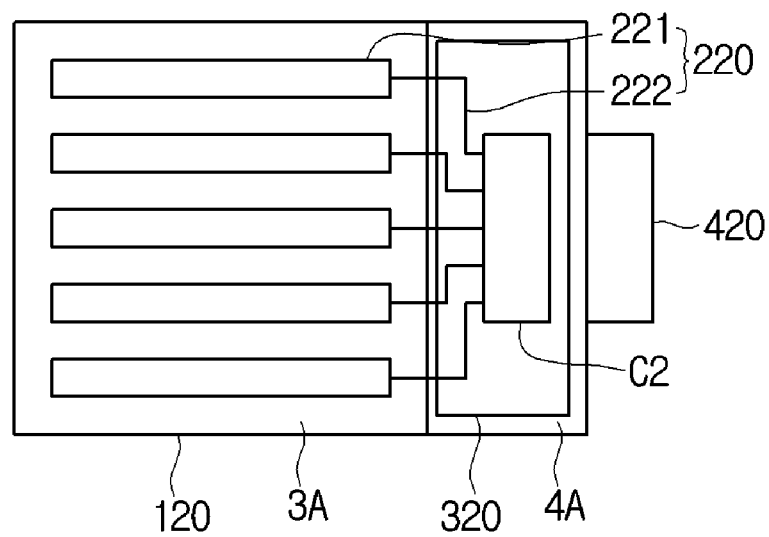

Referring to FIGS. 1 and 2, the first substrate 110 of the fingerprint sensor according to the first embodiment may include first and second areas 1A and 2A. In detail, the first substrate 110 may include the first and second areas 1A and 2A connected with each other.

In other words, the first and second areas 1A and 2A may be formed integrally with each other. The first area 1A may be provided therein with a first electrode 210. In detail, the first area 1A may be provided therein with a first sensing part 211 and a first wiring part 212.

The first sensing part 211 may extend in one direction on the first area 1A. In addition, the first wiring part 212 may be connected with one end of the first sensing part 211.

A first circuit board 310 may be provided in the second area 2A. In detail, the first circuit board 310 may be provided on one surface of the second area 2A. The first circuit board 310 may be partially provided on one surface of the second area 2A. In other words, an area of the first circuit board 310 may be smaller than that of the second area 2A.

Accordingly, all of the first sensing part 211, the first wiring part 212, and the first circuit board 310 may be provided on one substrate, that is, the first substrate 110.

The first circuit board 310 may be bonded onto the second area 2A of the first substrate 110 using an anisotropic conductive film (ACF) or an anisotropic conductive adhesive (ACA).

The first chip C1 may be bonded onto the first circuit board 310. In other words, the first chip C1 may be mounted on the first circuit board 310. For example, the first chip C1 may be bonded to the first circuit board 310 using the ACF or the ACA.

A chip on film (COF) may be further provided between the first circuit board 310 and the first chip C1. In other words, the first chip C1 may be provided on the COF film.

The first wiring part 212 may extend from the first area 1A toward the second area 2A, and may be connected with the first chip C1 mounted on the first circuit board 310 of the second area 2A.

Referring to FIG. 2, the second substrate 120 of the fingerprint sensor according to the first embodiment may include third and fourth areas 3A and 4A. In detail, the second substrate 120 may include the third area 3A and the fourth area 4A connected with each other. In other words, the third area 3A may be formed integrally with the fourth area 4A.

The third area 3A may be provided therein with the second electrode 220. In detail, the second sensing part 221 and the second wiring part 222 may be provided on the third area 120.

The second sensing part 221 may extend in a direction different from one direction on the third area 120, that is, may extend in a direction different from a direction in which the first sensing part 211 extends. In addition, the second wiring part 222 may be connected with one end of the second sensing part 221.

The fourth area 4A may be provided therein with a second circuit board 320. In detail, the second circuit board 310 may be provided on one surface of the fourth area 4A. The second circuit board 320 may be partially provided on one surface of the fourth area 4A. In other words, the area of the second circuit board 320 may be smaller than that of the fourth area 4A.

Accordingly, all of the second sensing part 221, the second wiring u nit 222, and the second circuit board 320 may be provided on one substrate, that is, the second substrate.

The second circuit board 320 may be bonded to the third area 3A of the second substrate 120 using the ACF or the ACA.

The second chip C2 may be bonded to the second circuit board 320. In other words, the second chip C2 may be mounted on the second circuit board 320. For example, the second chip C2 may be bonded to the second circuit board 320 using the ACF or the ACA.

A COF may be further provided between the second circuit board 320 and the second chip C2. In other words, the second chip C2 may be provided on the COF film.

The second wiring part 222 may extend from the third area 3A toward the fourth area 4A, and may be connected with the second chip C2 mounted on the second circuit board 320 of the fourth area 4A.

Figure 3:
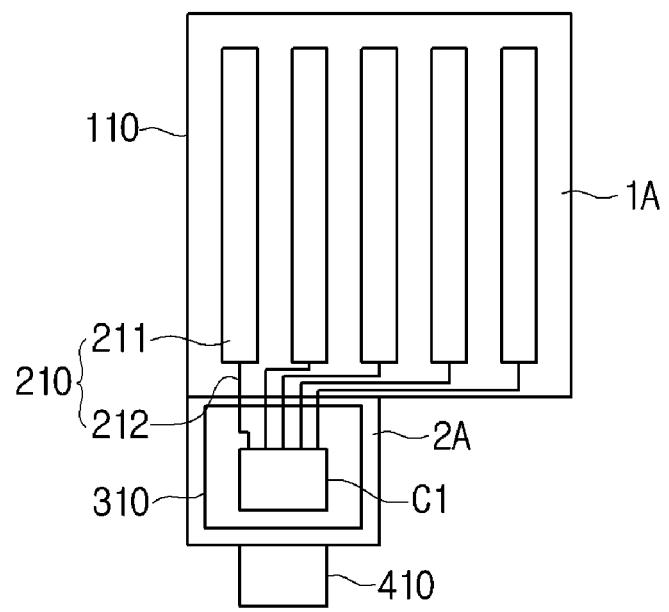
FIGS. 3 and 4 are exploded plan views showing a fingerprint sensor according to another example of the first embodiment.
Figure 4:
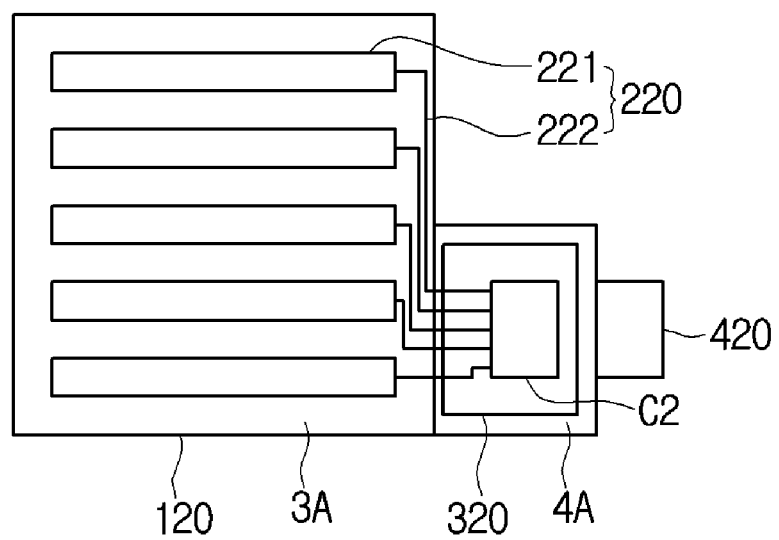

FIGS. 3 and 4 are views showing a fingerprint sensor according to another embodiment.

Referring to FIG. 3, the first substrate 110 of the fingerprint sensor according to the second embodiment may include the first and second areas 1A and 2A.

The first area 1A of the first substrate 110 may be different from the second area 2A in size. In detail, the size of the second area 2A may be smaller than the size of the first area 1A. In more detail, the connection surface between the second area 2A and the first area 1A may be smaller than one surface of the first area 1A.

Since the second area 2A is smaller than the first area 1A, when the second area 2A is folded, stress may be reduced, so that the second area 2A may be easily folded.

The first circuit board 310 may be provided in the second area 2A. In addition, the first chip C1 may be mounted on the first circuit board 310. The first circuit board 310 may be provided on the entire surface of the second area 2A or may be partially provided on one surface of the second area 2A.

In addition, referring to FIG. 4, the second substrate 120 may include the third area 3A and the fourth area 4A.

The third area 3A of the second substrate 120 may be different from the fourth area 4A in size. In detail, the size of the fourth area 4A may be smaller than the size of the third area 3A. In more detail, the connection surface between the fourth area 4A and the third area 3A may be smaller than one surface of the third area 3A.

Since the fourth area 4A is smaller than the third area 3A, when the fourth area 4A is folded, stress may be reduced, so that the fourth area 4A may be easily folded.

The second circuit board 320 may be provided in the fourth area 4A. In addition, the second chip C2 may be mounted on the second circuit board 320. The second circuit board 320 may be provided on the entire surface of the fourth area 4A or may be partially provided on one surface of the fourth area 4A.

Figure 5:
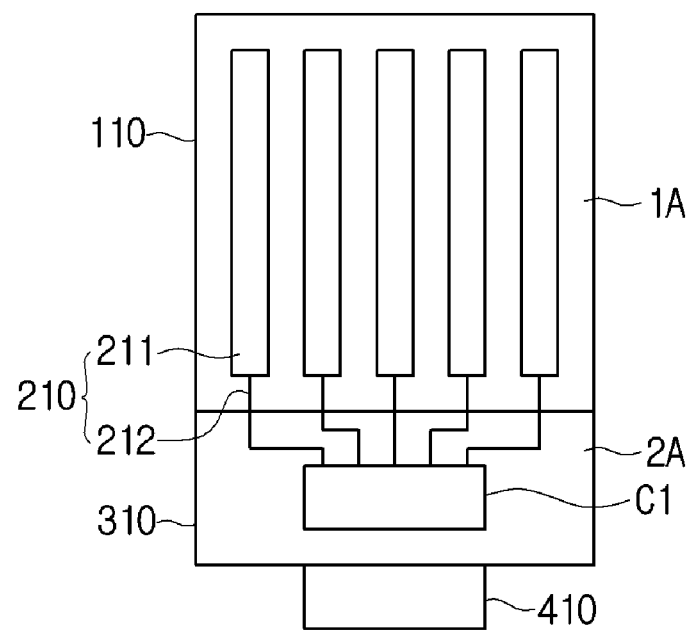
FIGS. 5 and 6 are exploded plan views showing a fingerprint sensor according to still another example of the first embodiment.
Figure 6:
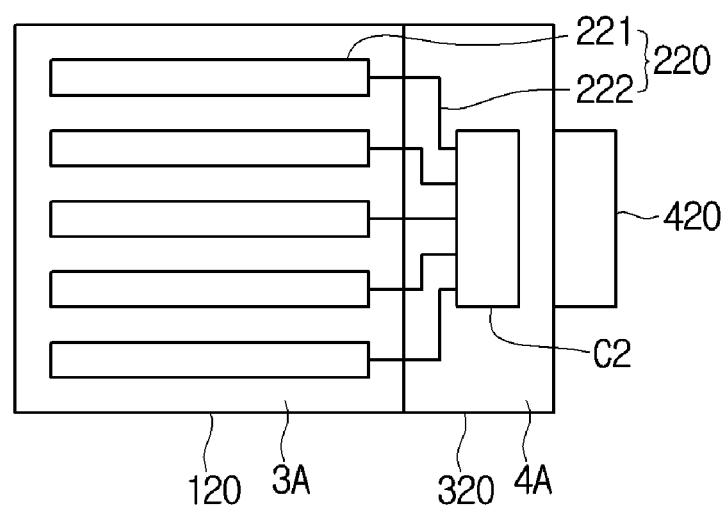
Figure 7:
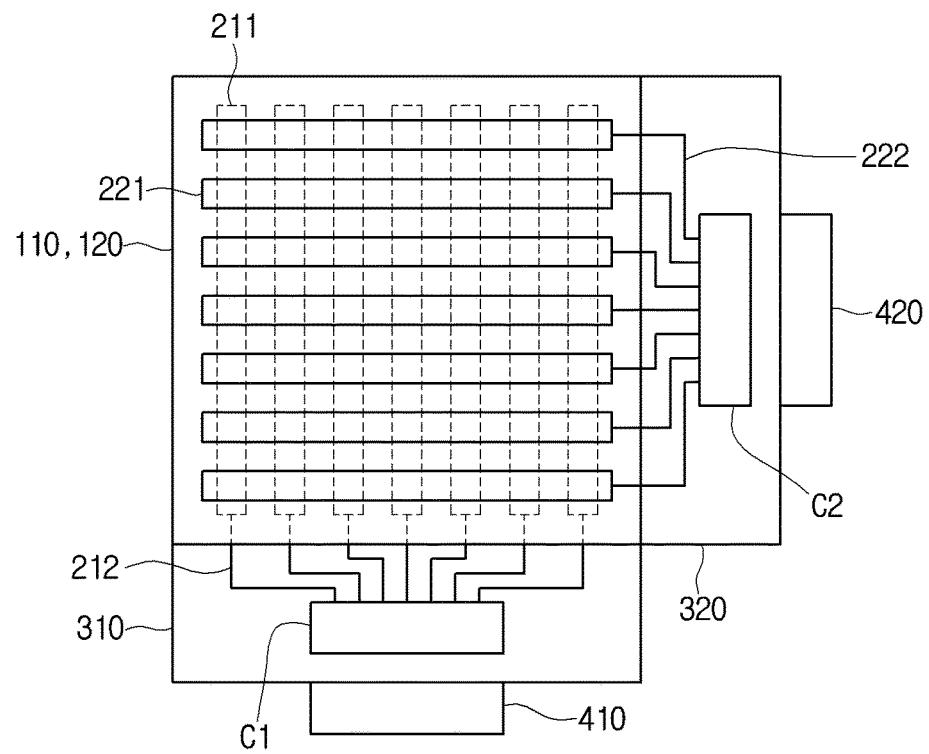
FIG. 7 is a plan view showing the combination structure of the fingerprint sensor shown in FIGS. 5 and 6.

FIGS. 5 to 7 are views showing a fingerprint sensor according to still another embodiment.

Referring to FIG. 5, the first substrate 110 of the fingerprint sensor according to the third embodiment may include first and second areas 1A and 2A.

The first and second areas 1A and 2A of the first substrate 110 may be different from each other in size. In detail, the size of the second area 2A may be smaller than the size of the first area 1A. In more detail, the length of the connection surface between the second area 2A and the first area 1A may be correspond to the length of one surface of the first area 1A or the length of one surface of the second area 2A.

The first circuit board 310 may be provided on the second area 2A. In addition, the first chip C1 may be mounted on the first circuit board 310. The first circuit board 310 may be provided on the entire surface of the second area 2A. In other words, the size of the contact area between the first circuit board 310 and the second area 2A may correspond to the size of the area of the first circuit board 310 or the second area 2A.

In addition, referring to FIG. 6, the second substrate 120 may include the third area 3A and the fourth area 4A.

The third and fourth areas 3A and 4A of the second substrate 120 may be different from each other in size. In detail, the size of the fourth area 4A may be smaller than the size of the third area 3A. In more detail, the length of the connection surface between the fourth area 4A and the third area 3A may correspond to the length of one surface of the third area 3A or the fourth area 4A.

The second circuit board 320 may be provided on the fourth area 4A. In addition, the second chip C2 may be mounted on the second circuit board 320. The second circuit board 320 may be provided on the entire surface of the fourth area 4A. In other words, the size of the contact area between the second circuit board 320 and the fourth area 4A may correspond to the size of the area of the second circuit board 320 or the fourth area 4A.

Referring to FIG. 7, the first substrate 110 may be overlapped with the second substrate 120. For example, the size of the first substrate 110 may correspond to the size of the second substrate 120. The first substrate 110 may be overlapped with the second substrate 120 in such a manner that the first and second sensing parts 211 and 221 provided on the respective first and second substrates 110 and 120 may cross each other.

The first and second substrates 110 and 120 may be bonded to each other using an optically clear adhesive 600.

In addition, after the first and second substrates 110 and 120 are overlapped with each other and bonded to each other, the second area 2A of the first substrate 110 and the fourth area 4A of the second substrate 120 may be folded or curved toward a rear surface of the first area 1A or to a rear surface of the third area 3A. In detail, the second area 2A and the fourth area 4A may be folded in mutually different directions.

Accordingly, the distance between the sensing part and the chip may be shorted.

Figure 9:
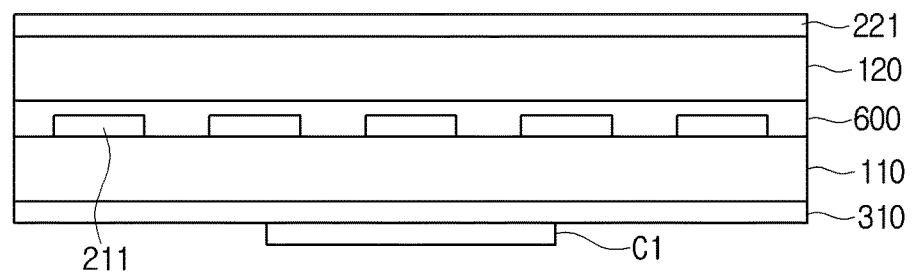
FIG. 9 is a sectional view taken along line A-A' of FIG. 8.

For example, as shown in FIG. 9, when the second substrate 120 is provided on the first substrate 110, the first substrate 110 may have a first surface provided thereon with the first electrode 210 and a second surface opposite to the first surface. The second area 2A and the fourth area 4A may be folded toward the second surface of the first substrate 110.

Accordingly, the second area 2A and the fourth area 4A may be folded at 180° toward the second surface of the first substrate 110, and may make contact with a rear surface of the second substrate 120, that is, a surface of the second substrate 120 in which the second electrode 220 is not provided.

Accordingly, the first and second circuit boards 310 and 320 provided on the second and fourth areas 2A and 4A may be provided toward the second surface.

According to the fingerprint sensors of the above embodiments, the first substrate is bonded to the second substrate, and the second and fourth areas can be folded in the same direction.

Figure 8:
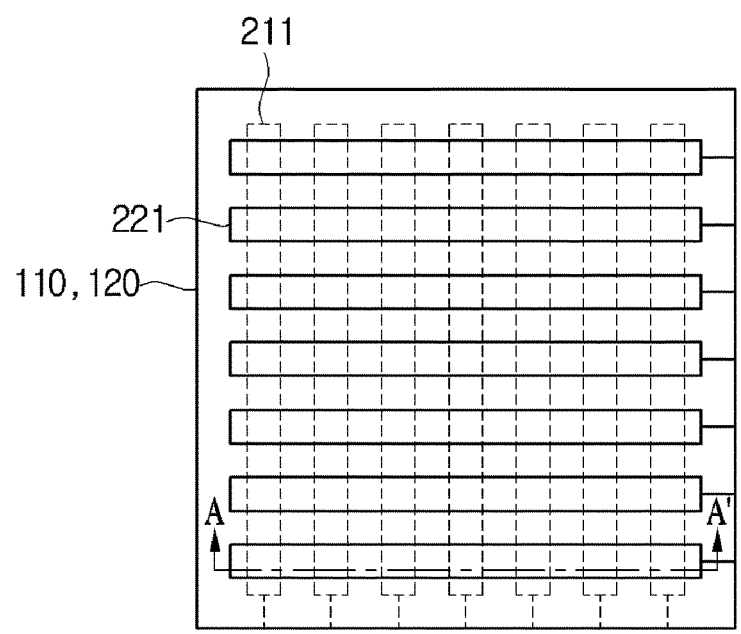
FIG. 8 is a plan view showing the folded structure of the fingerprint sensor according to still another example of the first embodiment and the front surface of the fingerprint sensor.

FIG. 8 is a plan view showing the folded fingerprint sensor, that is, showing the front surface of the fingerprint sensor. FIG. 9 is a sectional view taken along line A-A' of FIG. 8.

Referring to FIGS. 8 and 9, the first and second sensing parts 211 and 221 cross each other while extending in mutual different directions on the front surface of the fingerprint sensor.

Although FIGS. 8 and 9 show that the second sensing part 221 is provided on the first sensing part 211, the embodiment is not limited thereto. In other words, the first substrate 110 is provided on the second substrate 120, so that the first sensing part 211 may be provided on the second sensing part 221.

Figure 10:
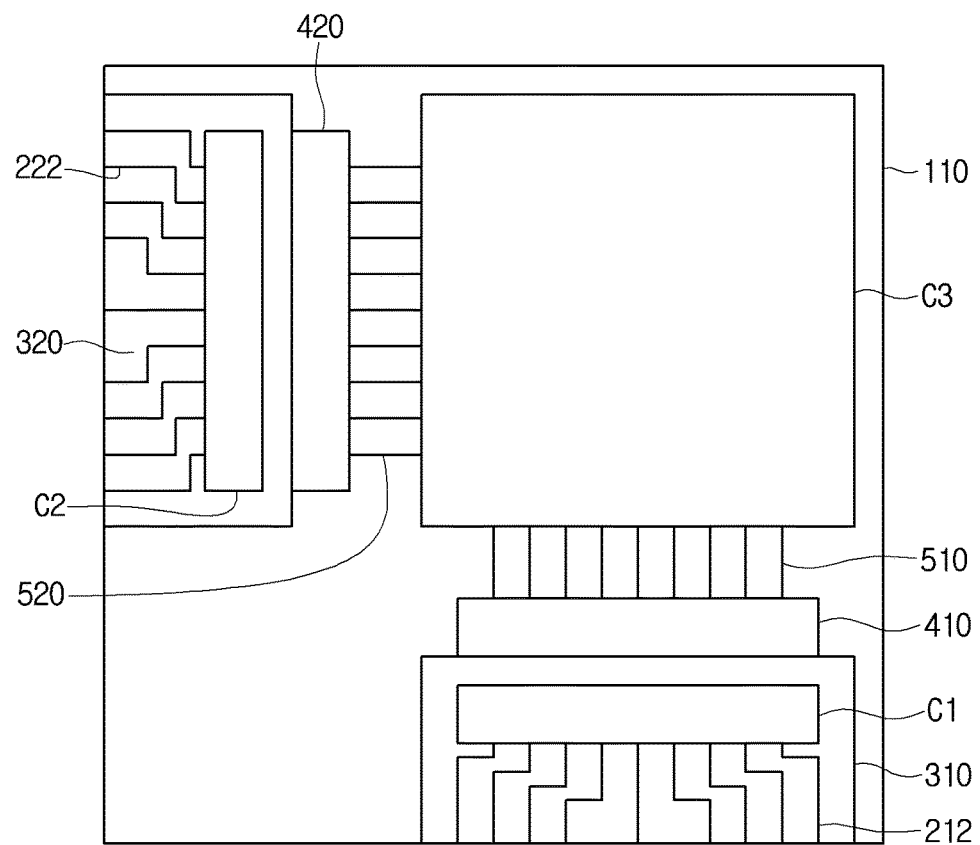
FIG. 10 is a plan view showing the folded structure of the fingerprint sensor according to still another example of the first embodiment and the front surface of the fingerprint sensor.

FIG. 10 is a plan view showing the folded fingerprint sensor, in detail, showing the rear surface of the fingerprint sensor.

Referring to FIG. 10, the first circuit board 310 of the second area 2A and the second circuit board 320 of the fourth area 4A may be provided on the rear surface of the fingerprint sensor, that is, on the second substrate 120. The first chip C1 may be mounted on the first circuit board 310 and the second chip C2 may be mounted on the second circuit board 320.

The first and second chips C1 and C2 may be connected with the third chip C3 on the second surface of the first substrate 110, that is, on the rear surface of the fingerprint sensor.

For example, the first and second chips C1 and C2 may serve as finger recognition driving chips, and the third chip C3 may serve as a main board driving chip. In other words, the finger recognition driving chip may be connected with an external main board driving chip. In detail, first and second connection parts 410 and 420 are connected with one end of the first circuit board 310 and one end of the second circuit board 320, respectively. The first chip C1 may be connected with the third chip C3 through a first connection wire 510 connected with the first connection part 410, and the second chip C2 may be connected with the third chip C3 through the second connection wire 520 connected with the second connection part 420.

According to the fingerprint sensor of the first embodiment, two circuit boards having chips mounted thereon are provided on certain areas of two substrates, and the certain areas provided thereon with the circuit boards are folded so that the chips connected with the electrodes may be provided on the rear surface of the substrates.

In other words, the first and second circuit boards having the chips mounted thereon may be provided on the certain areas of the first and second substrates, and the first and second circuit boards may be bent toward the main board driving chip.

Accordingly, the finger recognition driving chips can be connected with the main board driving chip within the shortest distance, or the first and second electrodes may be connected with each other within the shortest distance.

In the case of the fingerprint sensor, in order to detect the variation on a micro-cap, the distance between a sensing part and a chip must be short. On the contrast, as the sensing part becomes gradually away from the chip, the touch sensitivity of the fingerprint sensor may be degraded due to the noise resulting from the distance difference.

Therefore, according to the fingerprint sensor of the embodiment, the distance difference between the chip and the electrode, that is, the distance difference between the chip and the sensing parts can be reduced to the minimum value. Accordingly, the noise resulting from the distance difference between the chip and the sensing parts can be reduced, so that the touch characteristic and the reliability of the fingerprint sensor can be improved.

Hereinafter, a fingerprint sensor according to the second embodiment will be described with reference to FIGS. 11 to 17. In the following description of the fingerprint sensor according to the second embodiment, the description the same as or similar to the above description of the fingerprint sensor according to the first embodiment will be omitted, and the same elements will be assigned with the same reference numerals.

Referring to FIGS. 11 to 17, the fingerprint sensor according to the embodiment may include the substrate 100, an intermediate layer 500, and a chip C.

Figure 11:
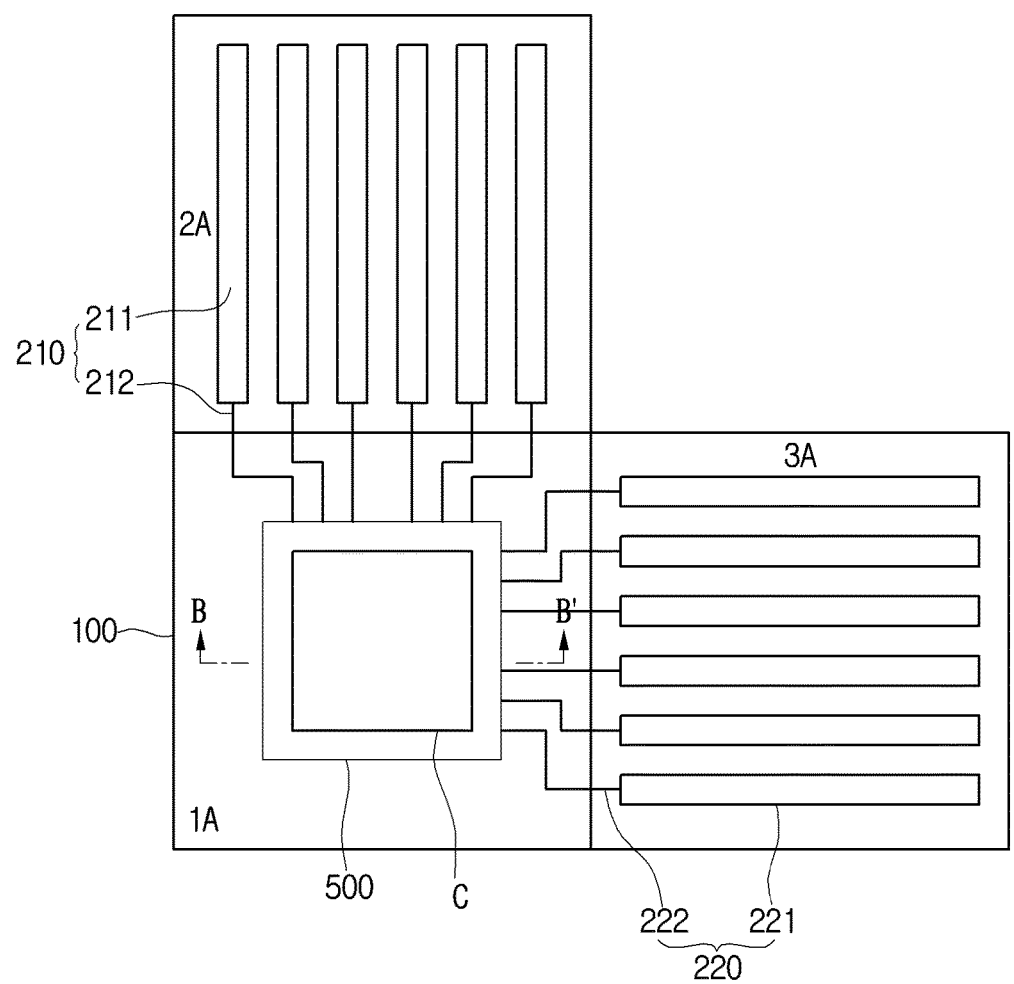
FIG. 11 is a plan view showing a fingerprint sensor according to the second embodiment.

The substrate 100 may include a first area 1A, a second area 2A, and a third area 3A. The first to third areas 1A to 3A may have equal sizes or different sizes. As shown in FIG. 11, the first to third areas 1A to 3A may have equal sizes, for example, equal sectional surfaces.

Figure 12:
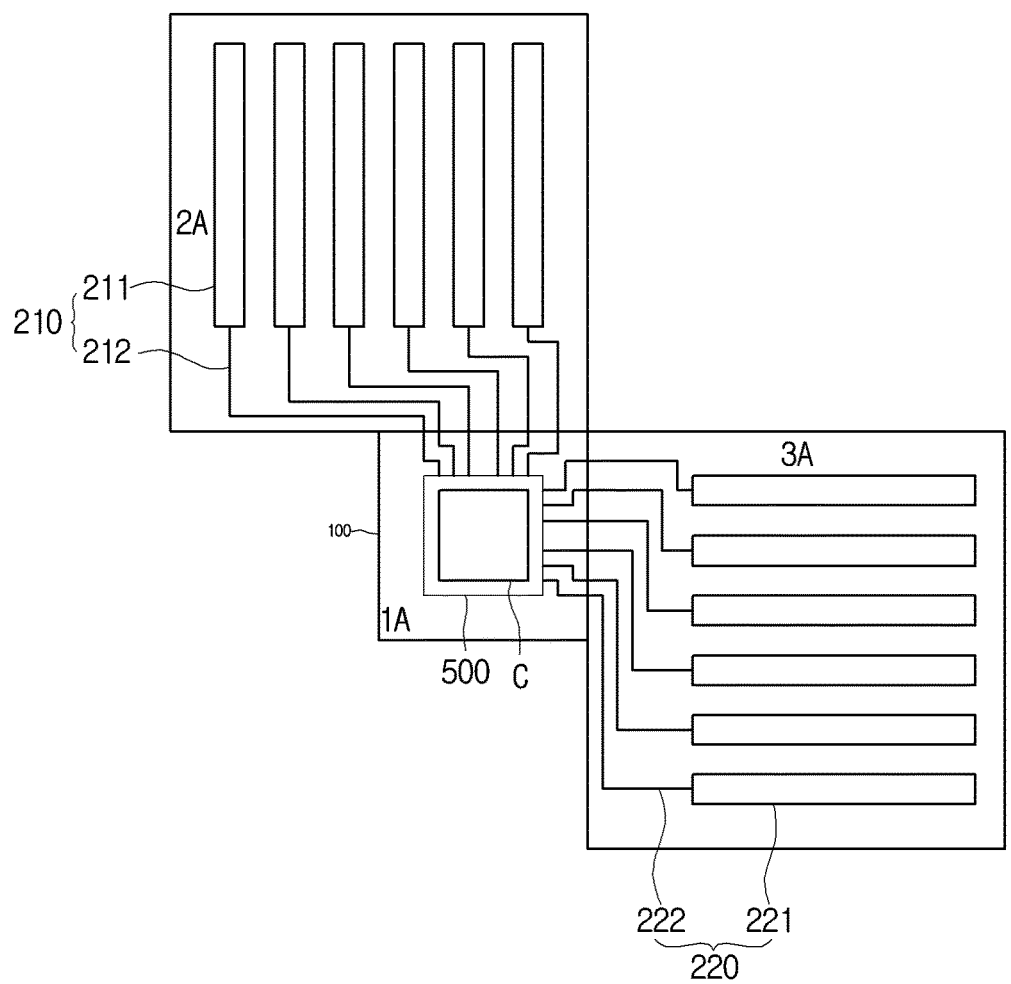
FIG. 12 is another plan view showing the fingerprint sensor according to the second embodiment.
Figure 13:
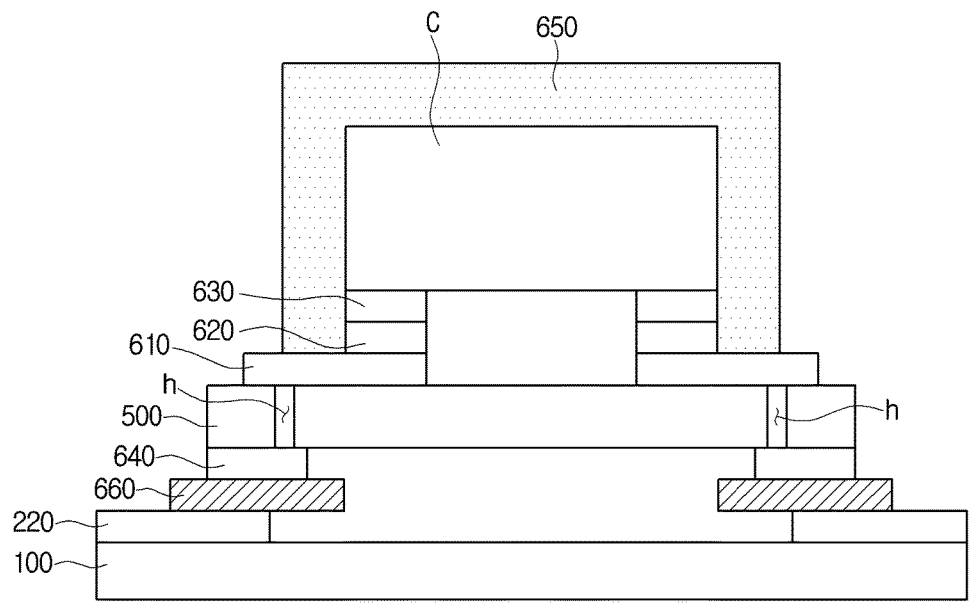
FIG. 13 is a sectional view taken along line B-B' of FIG. 11.

In addition, as shown in FIG. 12, the first to third areas 1A to 3A may have mutually different sizes. For example, the first area 1A provided therein with the chip C may have a size smaller than that of at least one of the second and third areas 2A and 3A.

The second area 2A and the third area 3A may be connected with one of the top surface, the bottom surface, the left lateral side, and the right lateral side of the first area 1A. For example, referring to FIG. 2, the second area 2A may be connected with the top surface of the first area 1A, and the third area 3A may be connected with the right lateral side of the first area 1A. However, the embodiment is not limited thereto, but the second area 2A may be connected with remaining surfaces other than the top surface of the first area 1A, and the third area 3A may be connected with remaining surfaces of the first area 1A other than the connection surface with the second area 2A and the right lateral side of the first area 1A.

As shown in FIG. 12, when the second area 2A is connected with the top surface of the first area 1A, and the third area 3A is connected with the right lateral side of the first area 1A, the whole shape of the substrate 100 may have an L shape.

Although the first to third areas 1A to 3A formed separately from each other have been described in the above description and will be described in the following description for the convenience of explanation, the embodiment is not limited thereto, but the first area 1A, the second area 2A, and the third area 3A may be formed integrally with each other.

The intermediate layer 500 and the chip C may be provided on the first area 1A. In detail, the intermediate layer 500 may be provided on the first area 1A of the substrate 100, and the chip C may be provided on the intermediate layer 500.

In detail, the chip C may be mounted on the intermediate layer 500, and the intermediate layer 500 having the chip C mounted thereon may be provided on the first area 1A of the substrate 100.

The intermediate layer 500 may include plastic. For example, the intermediate layer 500 may include plastic and may be printed with a circuit electrode pattern. For example, the intermediate layer 500 may include polyimide. A circuit electrode pattern 610 may be formed on at least one of one surface and an opposite surface of the intermediate layer 500. In addition, the chip C may be a fingerprint recognition driving chip.

The chip C may be mounted on the intermediate layer 500 through a surface mount technology (SMC).

A connection electrode layer 620 may be provided on one surface of the intermediate layer 500 for the connection with the chip C. For example, the connection electrode layer 620 plated with metal may be provided on the intermediate layer 500. For example, the connection electrode layer 620 may include tin (Sn).

The connection electrode layer 620 may serve as a connector to connect the chip C with the intermediate layer 500. In detail, the circuit electrode pattern 610 may be provided on one surface of the intermediate layer 500, and the connection electrode layer 620 including Sn may be formed on the terminal of the circuit electrode pattern 610.

Accordingly, after aligning the connection electrode layer 620 and a terminal 630 of the chip C, heat treatment is performed with respect to the resultant structure at the temperature of about 200° C. to about 250° C., for example, the temperature of about 220° C., so that the connection electrode layer 620 and the terminal 630 of the chip may be mounted on the intermediate layer.

In order to protect the chip C from being external moisture, a molding member 650 may be provided on the chip C while surrounding the chip C.

Thereafter, the intermediate layer 500 having the chip C mounted thereon may be provided on the first area 1A of the substrate 100.

For example, a metal pattern 640 may be provided on a surface opposite to one surface of the intermediate layer 500 having the chip C mounted thereon, and a hole h is formed through the intermediate layer 500, so that the chip C making contact with the connection electrode layer 620 may be connected with the metal pattern 640 provided on the opposite surface of the intermediate layer 500 through the hole h.

Thereafter, after a bonding layer 660, such as an ACF or an ACA, is applied or provided on the metal pattern 640 and the substrate 100, the bonding layer 660 is subject to heat treatment at the temperature of about 130° C. to about 160° C., so that the intermediate layer 500 can be bonded onto the substrate 100.

Accordingly, the chip C may be bonded to the substrate 100. In other words, the chip C may be indirectly bonded to the substrate 100. For example, the electrode, for example, the wire electrode 320 provided on the substrate 100 can be electrically connected with the chip.

An electrode may be provided on the second area 2A and the third area 3A.

In detail, the first sensing part 211 may be connected with the first wiring part 212 on the second area 2A. The first sensing part 211 may extend in one direction on the second area 2A. In addition, the first wiring part 212 may be connected with one end of the first sensing part 211.

The second sensing part 221 may be connected with the first wiring part 222 on the third area 3A. The second sensing part 221 may extend in a direction different from one direction on the third area 3A. In other words, the second sensing part 221 may be provided while extending in a direction different from the extension direction of the first sensing part 211. In addition, the second wiring part 222 may be connected with one terminal of the second sensing part 221.

The first and second wiring parts 221 and 222 extend toward the first area 1A, so that the first and second wiring parts 212 and 222 may be connected with the chip C on the first area 1A.

The second area 2A and the third area 3A may be folded or curved. In other words, the second area 2A and the third area 3A may be folded. For example, the second area 2A and the third area 3A may be folded or curved in the same direction.

In detail, the second area 2A and the third area 3A may be folded toward the first area 1A. For example, the first area 1A may have one surface on which the chip C is provided and an opposite surface opposite to the one surface. The second area 2A and the third area 3A may be folded toward the opposite surface of the first area 1A.

That is to say, in the first area 1A, the second area 2A, and the third area 3A provided on the same plane, the second area 2A and the third area 3A may be folded by 180° toward the opposite surface of the first area 1A. Accordingly, the first area 1A may be provided on one surface thereof with the intermediate layer 500 and the chip C, and may be provided on an opposite surface thereof with the electrode, that is, the first and second sensing parts 211 and 221.

Figure 14:
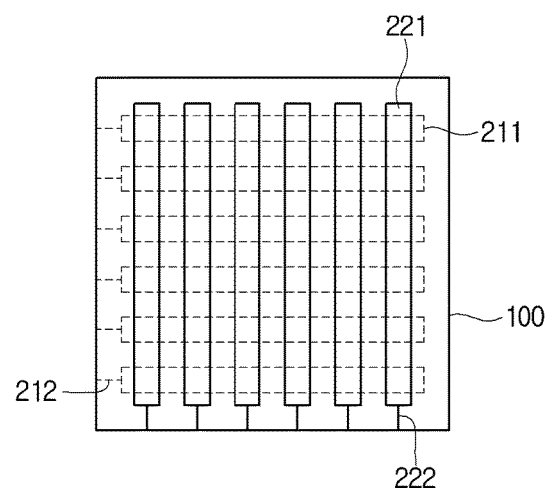
FIG. 14 is a plan view showing the folded structure of the fingerprint sensor according to the second embodiment and the front surface of the fingerprint sensor.

FIG. 14 is a plan view showing the fingerprint sensor in which the second and third areas are folded toward the first area, and showing the front surface of the fingerprint sensor.

Referring to FIG. 14, the fingerprint sensor is provided on the front surface thereof with the first and second sensing parts 211 and 221 extending in mutually different directions.

Although FIG. 14 shows that the second sensing part 221 is provided on the first sensing part 211, the embodiment is not limited thereto, but the first sensing part 211 may be provided on the second sensing part 221 when the third area 3A is folded and then the second area 2A is folded.

Although not shown in drawings, an OCA is interposed between the first and second sensing parts 311 and 321, that is, between the second area 2A and the third area 4A, so that the second area 2A may be bonded to the third area 3A.

Figure 15:
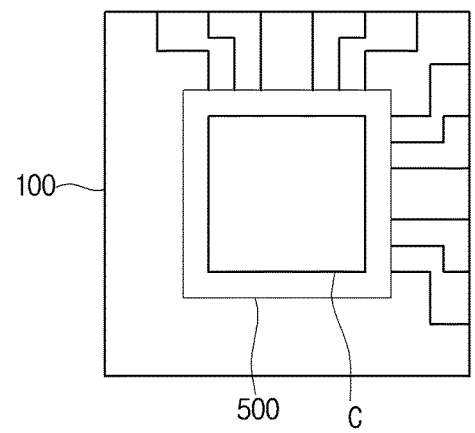
FIG. 15 is a plan view showing the folded structure of the fingerprint sensor according to the second embodiment and the rear surface of the fingerprint sensor.

FIG. 15 is a plan view showing the fingerprint sensor in which the second and third areas are folded toward the first area, and showing the rear surface of the fingerprint sensor.

Referring to FIG. 15, the fingerprint sensor may be provided on rear surface thereof with the intermediate layer 500 and the chip C on the intermediate layer 500. As described above, after the chip C is bonded to the intermediate layer 500, the intermediate layer 500 having the chip C may be bonded onto the first area 1A.

The intermediate layer 500 may be provided on the entire surface of the first area 1A or a partial surface of the first area 1A.

Figure 16:
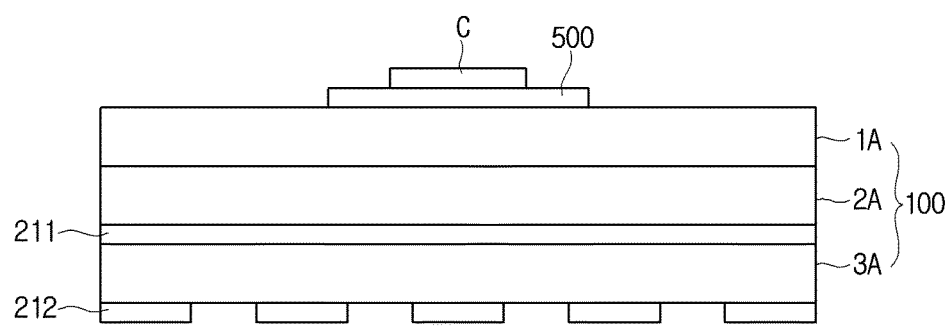
FIG. 16 is a sectional view showing the fingerprint sensor according to the second embodiment.

Referring to FIG. 16, the intermediate layer 500 may be provided on a partial surface of the first area 1A. Although FIG. 16 shows that the intermediate layer 500 is provided at the center of the first area 1A, the embodiment is not limited thereto, but the intermediate layer 500 may be provided on an edge of the first area 1A.

Figure 17:
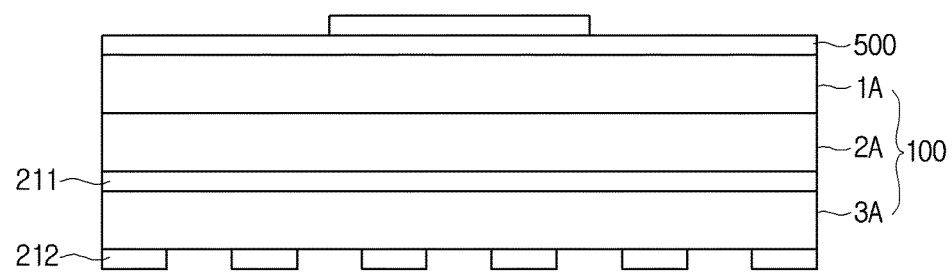
FIG. 17 is another sectional view showing the fingerprint sensor according to the second embodiment.

Referring to FIG. 17, the intermediate layer 500 may be provided on the entire surface of the first area 1A. In detail, the intermediate layer 500 may be provided on the first area 1A in size equal to that of the first area 1A and may be provided on the entire surface of the first area 1A.

The chip C, that is, the fingerprint recognition driving chip is connected with the first sensing unit and the second sensing unit through the first wiring part and the second wiring part, respectively, and connected with the external main board driving chip to perform a fingerprint recognition function. In other words, one end of the chip C may be connected with the first and second sensing units, and an opposite end of the chip C may be connected with the external main board driving chip.

According to the fingerprint sensor of the second embodiment, a chip may be mounted on a substrate having an electrode by using an intermediate layer. In other words, the chip may be directly mounted on the substrate by using the intermediate layer.

The temperature for the mounting of the chip is about 200° C. or more. it is impossible to directly mount the chip on the substrate at the temperature of about 200° C. to about 250° C. using a bonding layer, that is, the ACF due to the weak heat-resistant of the ACF. Accordingly, after mounting the chip on the COF film at the temperature of 200° C. or more using the intermediate layer through the surface mount technology, the intermediate layer having the chip is bonded to the substrate using the ACA at the mounting temperature or less, for example, at the temperature of about 130° C. to about 160° C., so that the chip can be indirectly mounted on the substrate.

In the case of the fingerprint sensor, in order to detect the variation on a micro-cap, the distance between a sensing part and a chip must be short. On the contrast, as the sensing part becomes gradually away from the chip, the touch sensitivity of the fingerprint sensor may be degraded due to the noise resulting from the distance difference.

Therefore, according to the fingerprint sensor of the embodiment, the chip is mounted on the substrate, thereby reducing the distance difference between the chip and the electrode to the minimum value, that is, the distance difference between the chip and the sensing parts. Accordingly, the noise resulting from the distance difference between the chip and the sensing parts can be reduced, so that the touch characteristic and the reliability of the fingerprint sensor can be improved.

Hereinafter, a display device employing the touch window including the fingerprint sensor according to the above-described embodiments will be described with reference to FIGS. 18 to 21.

The fingerprint sensor according to the embodiment may be applied to the touch window or the touch pad. The touch window or the touch pad employing the fingerprint sensor may be used for the touch device, for example, a locking device or a power device.

For example, the fingerprint sensor may be used as a door lock mounted in a home front door or a door lock mounted in a vehicle door. In addition, the fingerprint sensor is applied to a safe to perform a door lock function.

In addition, the fingerprint sensor may perform a power function at a starting unit of the vehicle, that is, an on-off function, or may be used as a power device to turn on or turn off the power of an electronic product.

Figure 18:
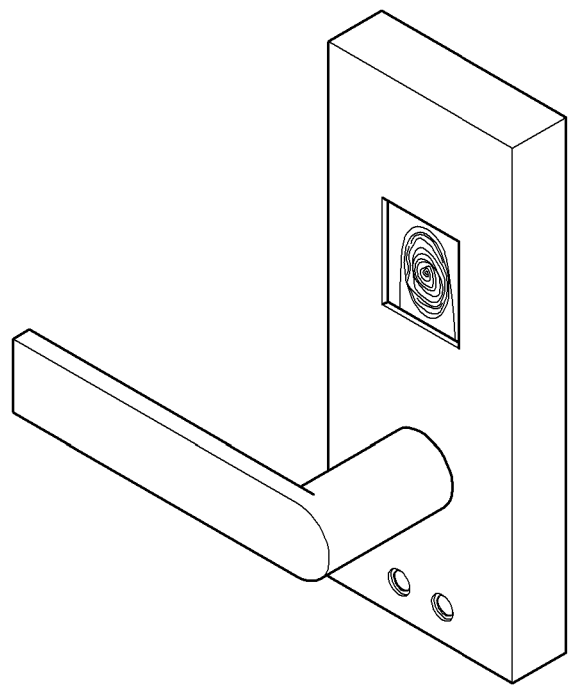
FIGS. 18 to 21 are views showing an example of a touch device employing the fingerprint sensor according to the embodiment or a touch window including the fingerprint sensor.
Figure 19:
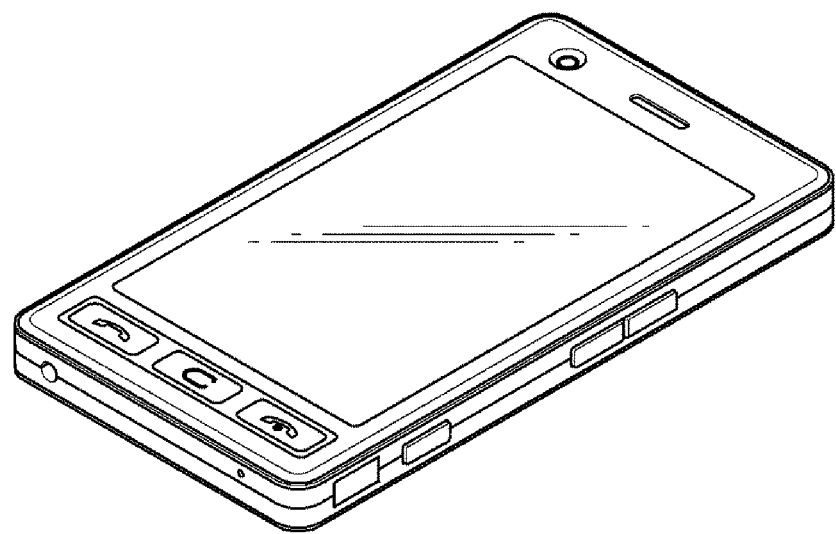

For example, as shown in FIG. 18, the fingerprint sensor according to the embodiments is coupled to the door lock to serve as a locking device of the door lock. In addition, as shown in FIG. 19, the fingerprint sensor is coupled to a cellular phone and thus applied to the locking device of a cellular phone.

Figure 20:
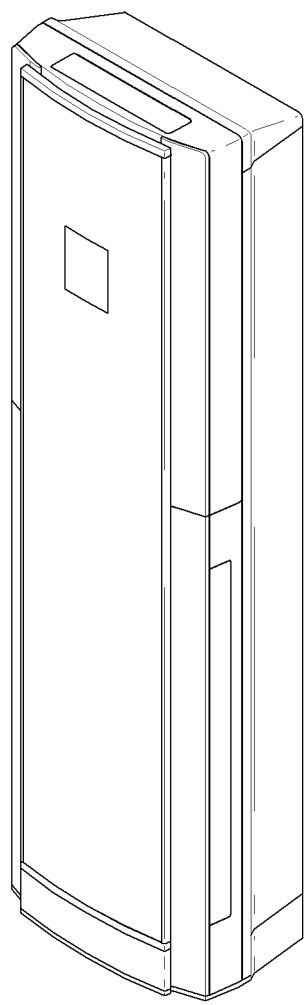
Figure 21:
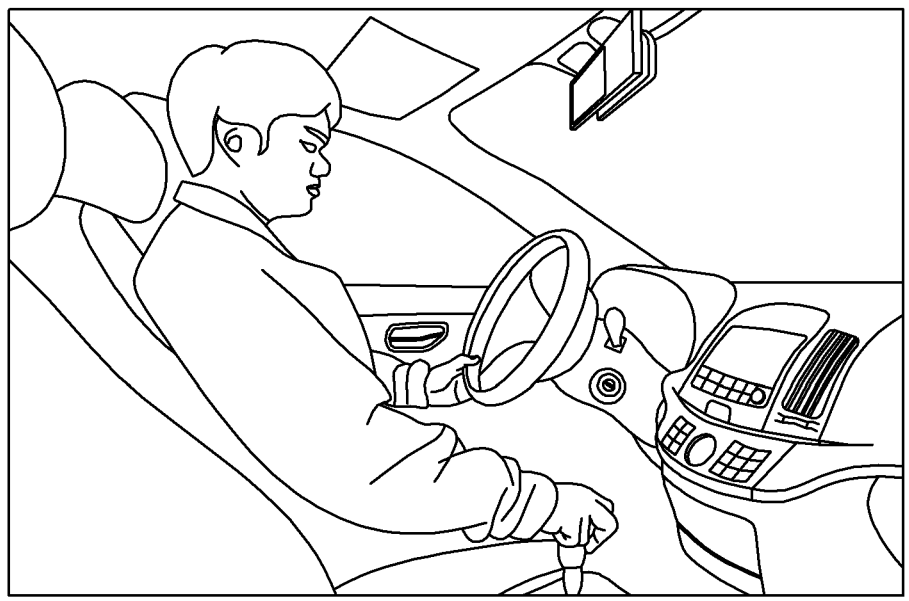

In addition, as shown in FIG. 20, the fingerprint sensor is coupled to an electronic device, such as an air conditioning device, so that the fingerprint sensor serves as a power device. In addition, as shown in FIG. 21, the fingerprint sensor is applied to a vehicle and thus applied to a power device of a starting device and a car audio of the vehicle.

The embodiment provides a fingerprint sensor having improved touch and electrical characteristics and a touch device including the same.

According to the embodiment, there is provided a fingerprint sensor including a first substrate, a second substrate on the first substrate, a first electrode and a first chip on the first substrate, and a second electrode and a second chip on the second substrate. The first substrate includes a first area and a second area, the second substrate includes a third area and a fourth area, the first electrode is provided on the first area, the first chip is provided on the second area, the second electrode is provided on the third area, and the second chip is provided on the fourth area.

As described above, according to the fingerprint sensor of the embodiment, two circuit boards having chips mounted thereon are provided on areas of two substrates, and the areas provided thereon with the circuit boards are folded so that the chips connected with the electrodes can be provided on the rear surface of the substrates.

In other words, the first and second circuit boards having the chips mounted thereon may be provided on the areas of the first and second substrates, and the first and second circuit boards can be bent toward the main board driving chip.

Accordingly, the finger recognition driving chips can be connected with the main board driving chip within the shortest distance, or the first and second electrodes may be connected with each other within the shortest distance.

In the case of the fingerprint sensor, in order to detect the variation on a micro-cap, the distance between a sensing part and a chip must be short. As the sensing part becomes gradually away from the chip, the touch sensitivity of the fingerprint sensor may be degraded due to the noise resulting from the distance difference.

Therefore, according to the fingerprint sensor of the embodiment, the distance difference between the chip and the electrode, that is, the distance difference between the chip and the sensing parts can be reduced to the minimum value. Accordingly, the noise resulting from the distance difference between the chip and the sensing parts can be reduced, so that the touch characteristic and the reliability of the fingerprint sensor can be improved.

In addition, according to the fingerprint sensor of the embodiment, the chip can be mounted on the support member having the electrode by using the intermediate layer. In other words, the chip can be indirectly mounted on the support member using the intermediate layer.

In the case of the fingerprint sensor, in order to detect the variation on a micro-cap, the distance between the sensing part and the chip must be short. As the sensing part becomes gradually away from the chip, the touch sensitivity of the fingerprint sensor may be degraded due to the noise resulting from the distance difference.

Therefore, according to the fingerprint sensor of the embodiment, the chip is mounted on the support member to reduce the distance difference between the chip and the electrode, that is, the distance difference between the chip and the sensing parts to the minimum value. Accordingly, the noise resulting from the distance difference between the chip and the sensing parts can be reduced, so that the touch characteristic and the reliability of the fingerprint sensor can be improved.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A fingerprint sensor comprising:
a first substrate;
a second substrate on the first substrate;
a first electrode and a first chip on the first substrate; and
a second electrode and a second chip on the second substrate,
wherein the first substrate comprises a first area and a second area,
the second substrate comprises a third area and a fourth area,
the first electrode is provided on the first area,
the first chip is provided on the second area,
the second electrode is provided on the third area, and
the second chip is provided on the fourth area,
wherein the second area is provided thereon with a first circuit board, and the first chip is provided on the first circuit board,
wherein the fourth area is provided thereon with a second circuit board, and the second chip is provided on the second circuit board,
wherein the first substrate has a first surface on which the first electrode is provided, and a second surface opposite to the first surface, and the first and second chips are connected with a third chip directly on the second surface of the first substrate,
wherein the second and fourth areas are folded toward the second surface,
wherein the second area and the fourth area are in direct physical contact with the second surface of the first substrate,
wherein the first area has a first edge surface between the first surface and the second surface, and the second area has a second edge surface adjacent to a portion of the first edge surface of the first area, and a length of a first connection surface between the second area and the first area is less than a length of the first edge surface of the first area, wherein the first connection surface is parallel to the first edge surface of the first area, wherein the third area has a first edge surface and the fourth area has a second edge surface adjacent to a portion of the first edge surface of the third area, and a length of a second connection surface between the fourth area and the third area is less than a length of the first edge surface of the third area, wherein the second connection surface is parallel to the first edge surface of the third area, wherein the first area having the first electrode provided thereon is a fixed area, and the third area having the second electrode provided thereon is a fixed area, wherein the second area having the first chip provided thereon is a folding area, and the fourth area having the second chip provided thereon is a folding area, wherein the first and second chips include a finger recognition driving chip, and wherein the third chip on the second surface of the first substrate includes a mainboard driving chip, wherein each of the first and second electrodes comprises a sensing part and a wiring part, wherein the sensing part comprises a first sensing part on the first area of the first substrate and a second sensing part on the third area of the second substrate, wherein the wiring part comprises a first wiring part connecting with the first electrode on the first substrate and a second wiring part connecting with the second electrode on the second substrate, wherein the first sensing part, the first wiring part and the first circuit board contact a same surface of the first substrate, wherein the second sensing part, the second wiring part and the second circuit board contact a same surface of the first substrate, wherein an area of the first area is greater than an area of the second area, wherein an area of the third area is greater than an area of the fourth area, wherein the first wiring part is electrically connected to the first chip, and the second wiring part is electrically connected to the second chip, and wherein the first chip is different than the second chip.

2. The fingerprint sensor of claim 1, wherein the first wiring part extends from the first area to the second area, and the second wiring part extends from the third area to the fourth area.

3. The fingerprint sensor of claim 2, wherein the first wiring part is connected with the first sensing part in the first area, and connected with the first chip in the second area, and the second wiring part is connected with the second sensing part in the third area, and the second wiring part is connected with the second chip in the fourth area.

4. The fingerprint sensor of claim 1, wherein the first and second substrate includes polyethylene terephthalate (PET).

5. A touch device comprising the fingerprint sensor according to claim 1.

6. The fingerprint sensor of claim 1, wherein the first and third areas are bonded with each other, wherein the second and fourth areas contact a surface of the second substrate in which the second electrode is not provided.

* * * * *